(12) United States Patent
Kadono et al.

(10) Patent No.: US 7,146,273 B2
(45) Date of Patent: Dec. 5, 2006

(54) NAVIGATION SYSTEM, NAVIGATION APPARATUS, AND SERVER APPARATUS

(75) Inventors: Hidenori Kadono, Tottori (JP); Kiyoshi Kodani, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 207 days.

(21) Appl. No.: 10/500,142

(22) PCT Filed: Feb. 6, 2003

(86) PCT No.: PCT/JP03/01281

§ 371 (c)(1),
(2), (4) Date: Jul. 8, 2004

(87) PCT Pub. No.: WO03/067191

PCT Pub. Date: Aug. 14, 2003

(65) Prior Publication Data

US 2005/0071077 A1    Mar. 31, 2005

(30) Foreign Application Priority Data

Feb. 7, 2002    (JP)    ............... 2002-031033
Mar. 18, 2002    (JP)    ............... 2002-074567

(51) Int. Cl.
*G01C 21/28*    (2006.01)

(52) U.S. Cl. ............ 701/208; 701/201; 701/207; 340/995.23

(58) Field of Classification Search ........ 701/200–202, 701/207–215, 23–26; 342/357.06, 357.09, 342/357.1; 340/988, 990.1
See application file for complete search history.

(56) References Cited

U.S. PATENT DOCUMENTS 6,324,467 B1 *    11/2001    Machii et al. ............... 701/200

FOREIGN PATENT DOCUMENTS

| JP | 8-261774 | 10/1996 |
|----|----------|---------|
| JP | 11-65436 | 3/1999 |
| JP | 2000-65591 | 3/2000 |
| JP | 2000-258172 | 9/2000 |
| JP | 2001-12960 | 1/2001 |
| JP | 2001-82965 | 3/2001 |
| JP | 2001-250194 | 9/2001 |

* cited by examiner

*Primary Examiner*—Y. Beaulieu
(74) *Attorney, Agent, or Firm*—Arent Fox PLLC (57) ABSTRACT

The Navigation Apparatus transmits to a server apparatus a current position, a destination, and an area of a geographical information stored in a geographic information memory part. The server apparatus receives them to calculate one or more potential routes from the current position to the destination; sets a potential passing-by point for each potential route in the area of the geographic information stored in the Navigation Apparatus; and transmits those potential passing-by points to the Navigation Apparatus. The Navigation Apparatus receives them to calculate traveling routes from the current position to the potential passing-by points and selects one of the potential passing-by points, thereby deciding the passing-by point as a temporary destination within the area of the geographic information stored in the Navigation Apparatus. In this way, the route navigation can be realized without increasing the memory capacity of the geographic information memory part of the Navigation Apparatus. Additionally, since only necessary information, such as the geographic information, passing-by points and the like, are transmitted and received, the communication cost can be reduced.

15 Claims, 8 Drawing Sheets

NAVIGATION APPARATUS

START
↓
SET DESTINATION LOCATION — S30
↓
TRANSMIT ROUTE SEARCH CONDITIONS — S31 ╌╌→ (to server)
↓
RECEIVE PASSAGE LOCATIONS — S32 ←╌╌ (from server)
↓
CALCULATE ROUTES FROM CURRENT LOCATION TO PASSAGE LOCATIONS — S33
↓
SELECT PASSAGE LOCATION — S34
↓
DISPLAY PLANNED ROUTE — S35
↓
WITHIN PREDETERMINED DISTANCE OF DESTINATION LOCATION? — S36
- N → (loop back to S35)
- Y → (A)

SERVER APPARATUS

RECEIVE ROUTE SEARCH CONDITIONS — S50
↓
CALCULATE PRELIMINARY ROUTES — S51
↓
SET PASSAGE LOCATIONS — S52
↓
ADD PRIORITY RANKS — S53
↓
TRANSMIT PASSAGE LOCATIONS — S54
↓
(B)

| No. | DISPLAY MODE | COMMUNICATION CHAGE(YEN) |
|---|---|---|
| 1 | ALL DETAILEDLY | a |
| 2 | DETAILEDLY ONLY AROUND DESTINATION LOCATION AND CITY AREAS | b |
| 3 | DETAILEDLY ONLY AROUND DESTINATION LOCATION | c |
| 4 | ALL ROUGHLY | d |

FIG.11

| No. | ADDITIONAL INFORMATION | SELECTED | ADDITIONAL CHARGE (YEN) |
|---|---|---|---|
| 1 | SIGHTSEEING SPOTS | NO | e |
| 2 | HOTELS | YES | f |
| 3 | EXPRESSWAYS | NO | g |
| 4 | GAS STATIONS | YES | h |
| 5 | TRANSPORTATION SYSTEMS | NO | i |
| 6 | TELEPHONE NUMBERS | NO | j |
| 7 | TRAFFIC CONDITION | YES | k |

NAVIGATION SYSTEM, NAVIGATION APPARATUS, AND SERVER APPARATUS

CROSS-REFERENCE TO RELATED APPLICATION

This application is a National Stage entry of International Application No. PCT/JP03/01281, filed Feb. 6, 2003, the entire specification claims and drawings of which are incorporated herewith by reference.

TECHNICAL FIELD

The present invention relates to a navigation apparatus that guides along a travel route from a start location to a destination location. The present invention also relates to a server apparatus that reads out map information from a database and that then transmits it to a navigation apparatus. The present invention further relates to a navigation system that exploits such a navigation apparatus and such a server apparatus.

BACKGROUND ART

Conventionally, a navigation apparatus is so configured as to acquire information on the current location by means of a current location detector such as a GPS (global positioning system) receiver, then read map information recorded on a recording medium such as a CD-ROM or DVD-ROM, and then display a map around the current location on a display, while visibly or audibly giving guidance on the current location. When fed with a destination location, a navigation apparatus can also calculate a planned travel route from the current location to the destination location and guide through that route.

On the other hand, there have been developed, for car-mounted use and for incorporation in cellular phones, navigation apparatuses that receive map information, planned travel routes, and the like from a server apparatus over a network. Such a navigation apparatus does not require a recording medium having map information and the like recorded thereon, and has simply to receive information from a server apparatus whenever necessary. This helps realize a low-cost navigation apparatus. Moreover, incessantly updated map information and the like can be coped with simply by updating the information stored in the server apparatus.

A navigation system comprising a navigation apparatus and a server apparatus as described above can be realized, for example, in the form of one of the following three systems. Here, it is assumed that a certain amount of map information is stored in the navigation apparatus itself. The first system is one in which the server apparatus performs both the initial searching of a travel route and the searching of a travel route as performed on deviating from the initially planned travel route. The second system is one in which the navigation apparatus performs both the initial searching of a travel route and the searching of a travel route as performed on deviating from the initially planned travel route. The third system is one in which the server apparatus performs the initial searching of a travel route and the navigation apparatus performs the searching of a travel route as performed on deviating from initially planned travel route.

However, in the first system described above, the navigation apparatus does not always have the map information corresponding to the travel route found by the server apparatus. In such a case, the navigation apparatus needs to newly acquire the map information, and the map information that it currently has becomes useless. Also in the searching of a travel route as performed on deviating from initially planned travel route, the navigation apparatus needs to communicate with the server apparatus to acquire the results of searching. This results in a high communication fee.

In the second system, for the navigation apparatus to search for a travel route to a destination location, it needs to acquire map information covering a wide area from the current location to the destination location. This requires a large-capacity storage device, and thus makes such a system impracticable.

In the third system, as in the first system, where the server apparatus performs the initial searching of a travel route, the navigation apparatus does not always have the map information corresponding to the travel route found by the server apparatus. Moreover, the searching of a travel route as performed on deviating from the initially planned travel route needs to be performed within the area covered by the map information that the navigation apparatus currently has, and thus the result of searching tends to be a travel route that leads back to the initially planned travel route.

A navigation apparatus can receive and display map information with a scale factor that is previously set by the user. Here, every time the user wants to change the scale factor of the map that is displayed while the user is being guided through a travel route, the user is required to operate scale change keys or the like to obtain the desired scale factor.

For example, when the user, while being guided through a travel route, leaves a city area and enters an expressway, where detailed guidance on the travel route is no longer necessary, the user typically likes to switch to a map with a lower scale factor (i.e., with a larger coverage area). Thereafter, when the user exits the expressway and approaches the destination location, the user needs a detailed map again, and thus typically likes to switch back to a map with a higher scale factor.

However, manually changing the scale factor as described above is troublesome for the user who is driving. On the other hand, always receiving map information with a high scale factor without ever changing the scale factor involves a large amount of data, and thus results in a high communication fee.

Moreover, as to how much the user will be charged as a communication fee for the receipt of how much map information with what scale factor, the user has no choice but to make a rough calculation by himself. Thus, to save an unnecessary communication fee, the user needs to minimize the amount of received data by frequently changing the scale factor of the received map information so that it is received with as low a scale factor as possible.

As described above, the operation required for the user to perform to frequency change the scale factor of map information while being anxious about the communication fee is a severe burden on the user who is driving.

DISCLOSURE OF THE INVENTION

It is an object of the present invention to provide a navigation apparatus that operates at a lower cost by receiving only necessary information and without requiring higher-capacity storage. It is another object of the present invention to provide a navigation apparatus that permits the user to previously know an expected communication fee and the like for the guidance along a travel route, that does not require the user to manually change the scale factor of maps while being guided along a travel route, and that can thus be used unsparingly and safely. It is still another object of the present invention to provide a server apparatus that transmits information to such a navigation apparatus, and to provide a navigation system comprising such a navigation apparatus and such a server apparatus.

To achieve the above objects, according to the present invention, a navigation apparatus transmits the current location, the destination location, and the area of the map information stored in the map information memory thereof to a server apparatus. On receiving these, the server apparatus calculates one or more preliminary travel routes from the current location to the destination location, sets, respectively for the preliminary travel routes, preliminary passage locations within the area of the map information stored in the navigation apparatus, and transmits the preliminary passage locations to the navigation apparatus. On receiving these, the navigation apparatus calculates, respectively for the preliminary passage locations, planned travel routes thereto from the current location, and, by selecting one of the passage locations, determines the passage location to be aimed at as a provisional destination location within the area of the map information that the navigation apparatus has. In this way, it is possible to achieve guidance along a travel route without increasing the storage capacity of the map information memory of the navigation apparatus. Moreover, since only necessary information is exchanged as map information, passage locations, and the like, it is possible to minimize the communication fee.

As the current location moves, the navigation apparatus repeatedly updates the map information, passage locations, and planned travel routes to accomplish guidance up to the destination location.

Even if a deviation from the initially planned travel route is recognized in the course of guidance along a travel route, it is possible to calculate planned travel routes again based on the preliminary passage locations. This eliminates the need for the user to return to the initially planned travel route, and thus helps realize a user-friendly navigation apparatus.

The server apparatus may give the preliminary passage locations different ranks of priority. This permits the server apparatus to determine the optimum planned travel route in view of the thus given ranks of propriety.

The combination of the scale factors or amounts of map information received by the navigation apparatus may be made previously selectable. This permits the scale factor of the displayed map to be switched automatically. This eliminates the need for the user to manually change the scale factor of maps in the course of guidance along a travel route as required conventionally, and thus helps realize a safe navigation apparatus that does not place a burden on the user who is driving.

The navigation apparatus may incorporate a list of different combinations of scale factors or amounts of such map information. This makes it possible to make necessary settings easily simply by selecting the desired combination of scale factors from the list. Alternatively, the server apparatus may incorporate a list of different combinations of scale factors or amounts of such map information. This makes it possible, even when changes are made in the list, to keep the contents of the list up to date easily.

Along with the above-mentioned list of combinations of scale factors, expected communication fees, expected received data amounts, or expected reception durations corresponding to the respective combinations may be displayed. This permits the user to previously know the communication fee, received data amount, or reception duration involved in the guidance of a travel route, and thus permits the user to unsparingly use the navigation apparatus.

BEST MODE FOR CARRYING OUT THE INVENTION

Figure 1:
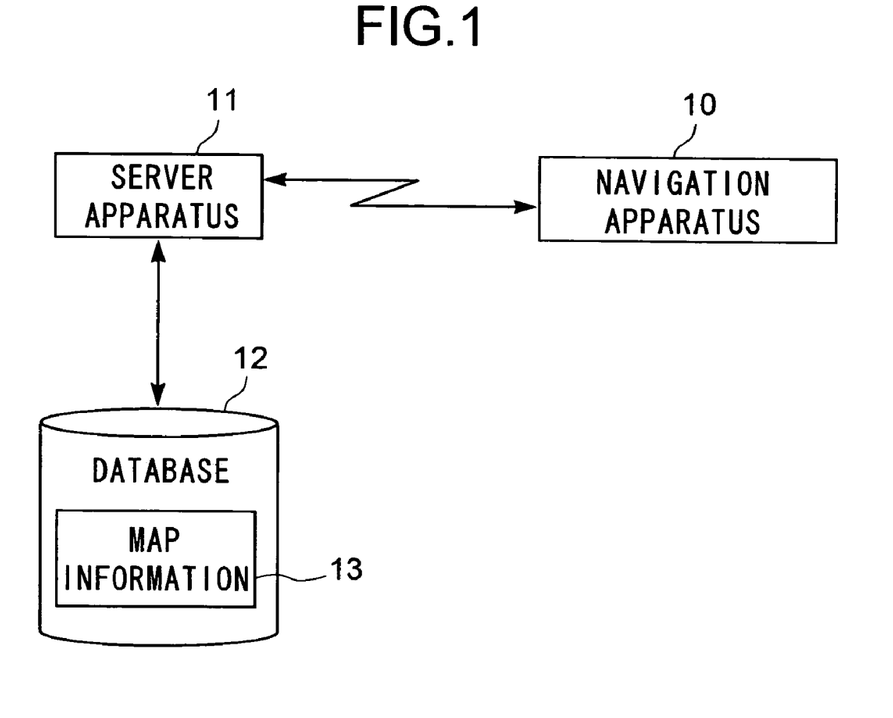
FIG. 1 is a schematic configuration diagram of a navigation system comprising a navigation apparatus and a server apparatus according to the invention.

FIG. 1 is a schematic construction diagram of a navigation system employing a navigation apparatus and a server apparatus according to the present invention. Reference number 10 represents a navigation apparatus. Reference number 11 represents a server apparatus that communicates with the navigation apparatus 10. Reference number 12 represents a database that is connected to the server apparatus 11. The database 12 has map information 13 with different scale factors.

When requested from the navigation apparatus 10, the server apparatus 11 reads out map information 13 from the database 12 and transmits it to the navigation apparatus 10. Here, the communication between the navigation apparatus 10 and the server apparatus 11 may be achieved by any means so long as it is conducted wirelessly. For example, in a case where their communication is achieved over the Internet, a telephone network such as one for car-mounted or cellular telephones can be used.

Figure 2:
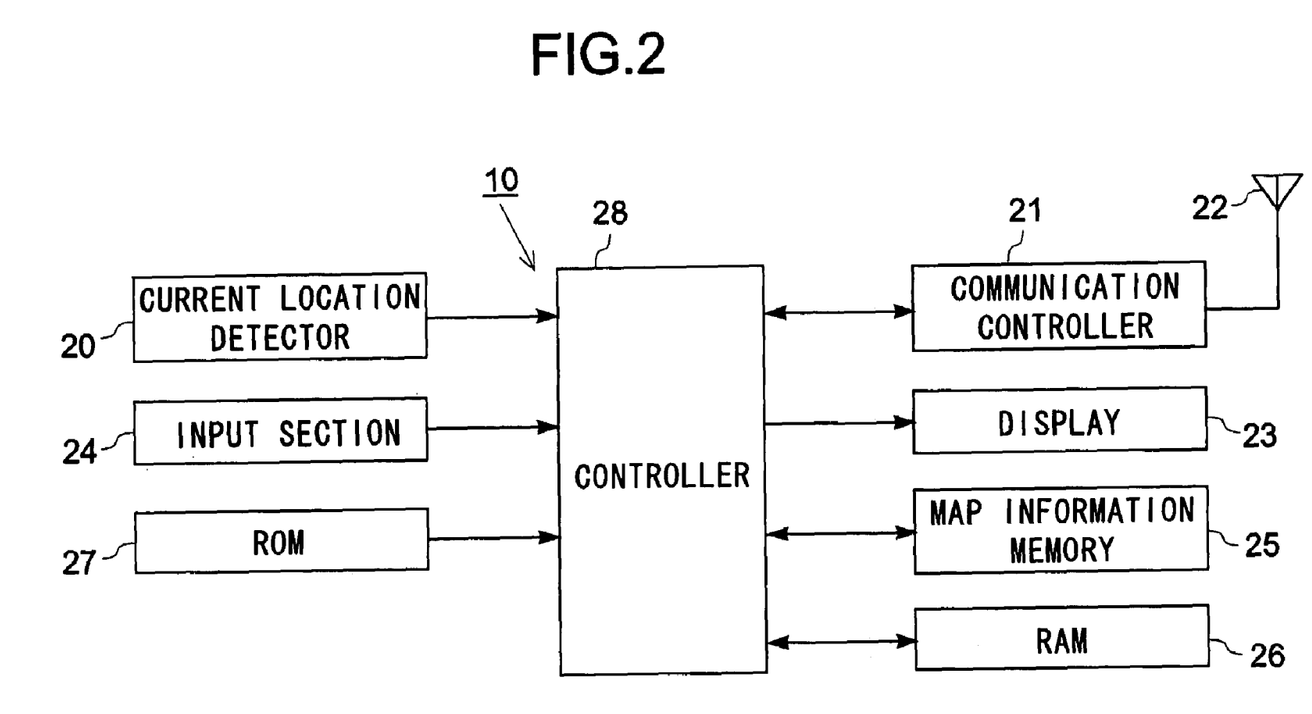
FIG. 2 is a schematic configuration diagram of a navigation apparatus according to the invention.

FIG. 2 is a schematic construction diagram of the navigation apparatus 10. Reference number 20 represents a current location detector that acquires information on the current location, travel direction, speed, altitude, and the like by using a GPS (global positioning system) receiver, a speed sensor, a gyro, and the like. Reference number 21 represents a communication controller that controls communication with the server apparatus 11. Reference number 22 represents an antenna that is connected to the communication controller 21 and by way of which wireless communication is conducted.

Reference number 23 is a display that is realized with a liquid crystal display or the like and on which map information and the current location are displayed. Reference number 24 represents an input section that permits the user to enter settings of the destination location and the like. Reference number 25 is a map information memory in which map information is stored. Reference number 26 represents a RAM in which the destination location, planned travel route, and the like are stored temporarily. Reference number 27 represents a ROM in which the program necessary for the navigation apparatus 10 to operate is stored. Reference number 28 represents a controller that is realized with a microcomputer or the like and that controls the navigation apparatus 10 according to the program stored in the ROM 27.

<First Embodiment>

Figure 3:
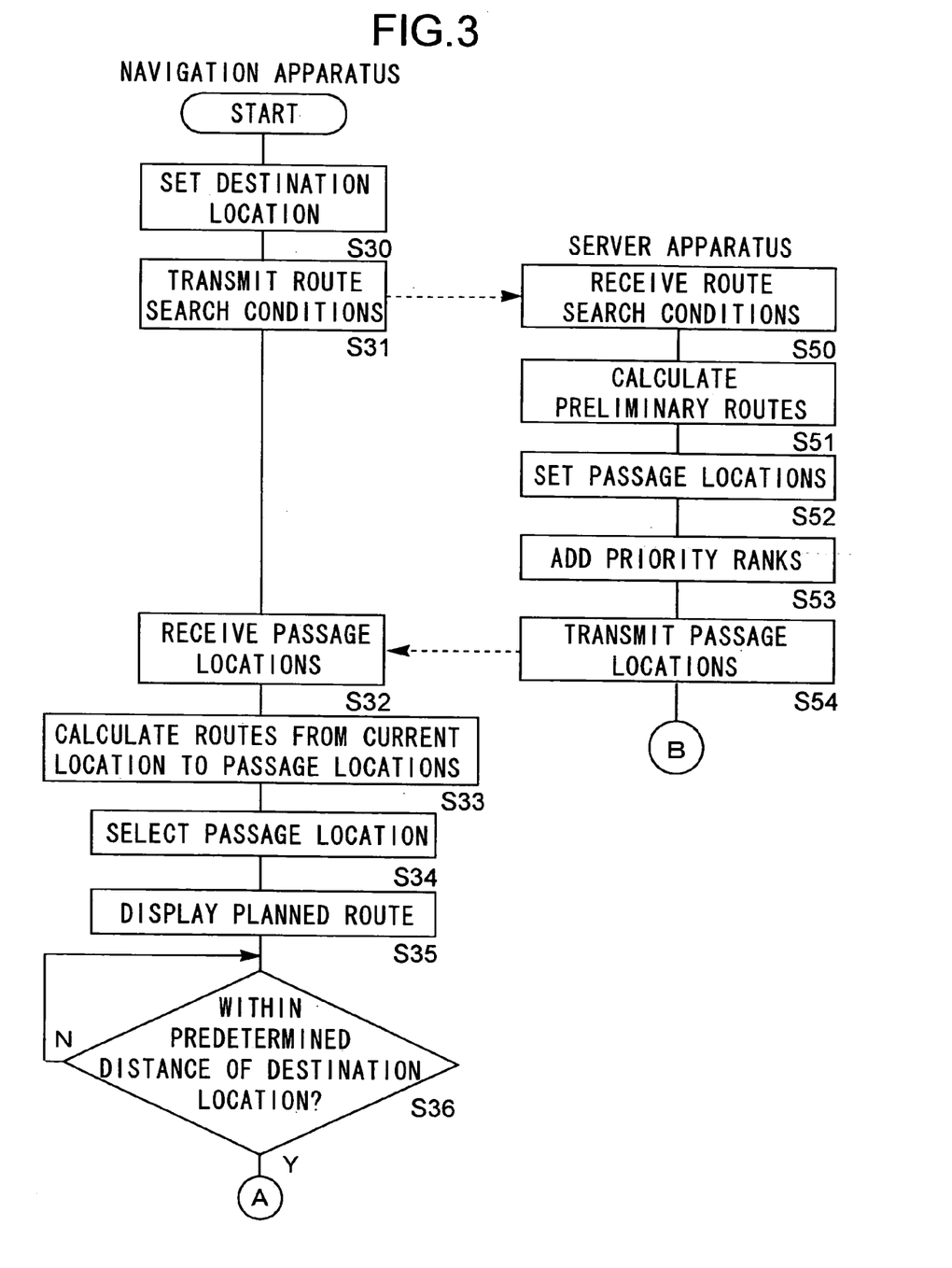
FIG. 3 is a flow chart showing the operation of a navigation apparatus and a server apparatus according to the invention.

Next, a description will be given of how the navigation system of a first embodiment of the invention operates to achieve guidance along a travel route. FIG. 3 is a flow chart showing the operation of the navigation apparatus 10 and the server apparatus 11. First, the user enters the destination location by operating the input section 24 of the navigation apparatus 10, and then presses a route search execution key (not illustrated). In response, in step S30, the navigation apparatus 10 stores the destination location in the RAM 26, and then, in step S31, the navigation apparatus 10 transmits to the server apparatus 11 route search conditions including location information on the current location and the destination location and the area of the map information stored in the map information memory 25. Here, it is assumed that, when travel route guidance is started, the navigation apparatus 10 has map information around the current location previously stored in the map information memory 25. This map information may be either that stored when the navigation apparatus 10 was used last time or that automatically received as map information around the current location (for example, the area within a 5 km radius of the current location) when the navigation apparatus 10 is turned on. The area transmitted to the server apparatus 11 may be an area of a map with a scale factor higher than a predetermined value (i.e., a detail map) so as to exclude any area of a countrywide map as will not be used in the course of travel route guidance.

Figure 5:
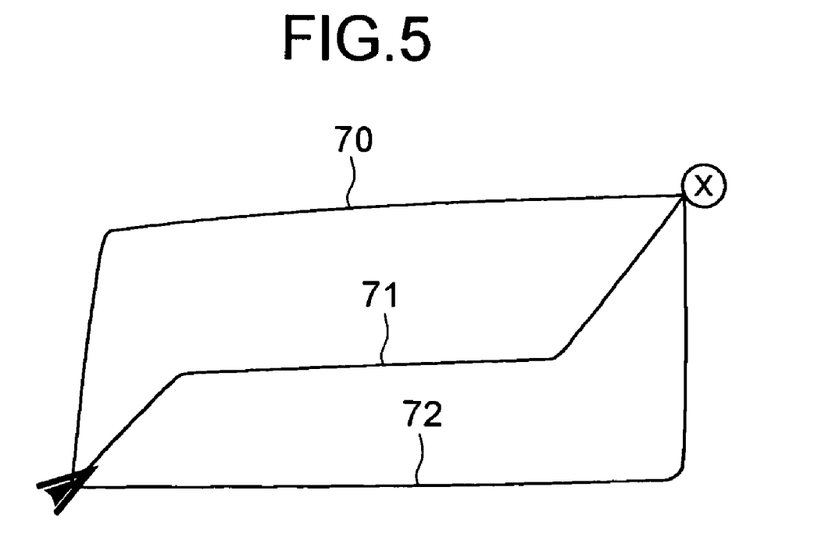
FIG. 5 is a diagram showing an example of preliminary travel routes from the current location to the destination location.

On completion of step S31, in step S50, the server apparatus 11 receives the route search conditions from the navigation apparatus 10, and then, in step S51, the server apparatus 11 calculates one or more preliminary travel routes from the current location to the destination location by accessing the database 12. FIG. 5 shows an example of such preliminary travel routes. In the figure, an arrow indicates the current location of the navigation apparatus 10, and the symbol X indicates the destination location. In FIG. 5, there are shown three preliminary travel routes 70, 71, and 72.

Figure 6:
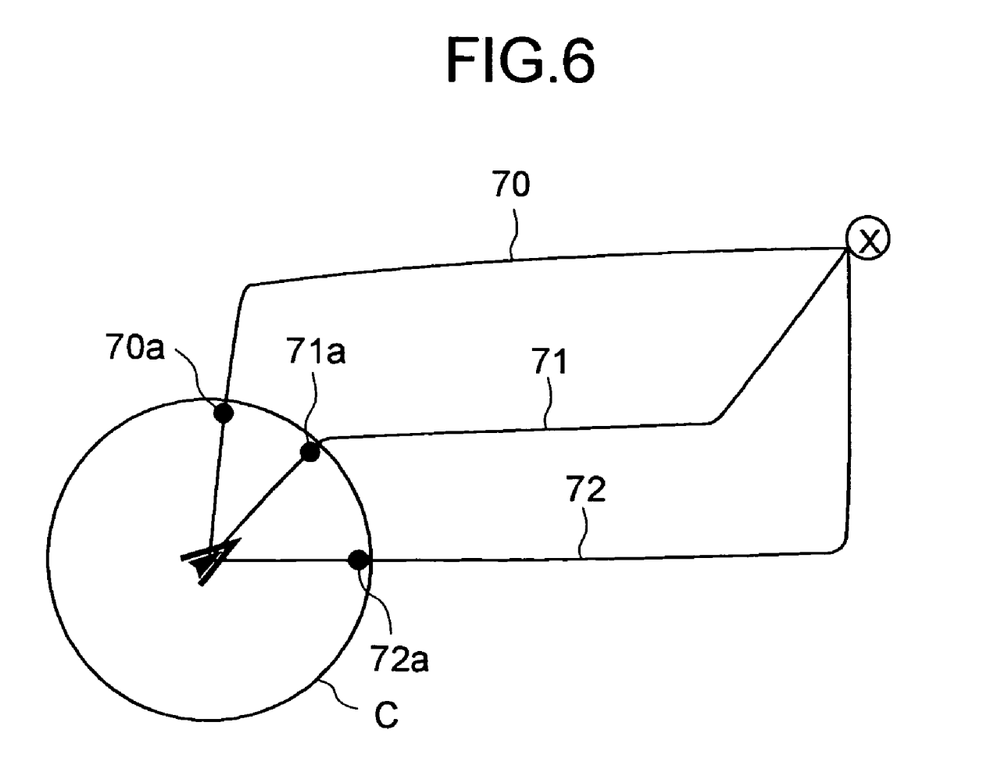
FIG. 6 is a diagram showing preliminary passage locations in addition to the preliminary travel routes shown in FIG. 5.

After step S51, in step S52, the server apparatus 11 sets, respectively for the calculated preliminary travel routes, preliminary passage locations on those travel routes within the area of the map information stored in the map information memory 25. Here, it is preferable that those preliminary passage locations be as far away as possible from the current location within the area of the stored map information. FIG. 6 is a diagram showing the preliminary passage locations added on to the preliminary travel routes. In the figure, a circle C indicates the area that the server apparatus 11 has received from the navigation apparatus 10 (i.e., the area of the map information stored in the map information memory 25), and points 70a, 71a, and 72a represent the preliminary passage locations on the preliminary travel routes 70, 71, and 72, respectively. Although the area has a circular shape here, it may have any other shape.

After step S52, in step S53, as shown in FIG. 5, the server apparatus 11 gives the preliminary travel routes different ranks of priority according to the traffic, distance, and other factors on those routes, and then, according to those ranks of priority, as shown FIG. 6, the server apparatus 11 also gives the preliminary passage locations different ranks of priority. Incidentally, information on the traffic on given routes can be obtained by exploiting a traffic information service such as the VICS (Vehicle Information and Communication System).

After step S53, in step S54, the server apparatus 11 transmits to the navigation apparatus 10 location information on the preliminary passage locations 70a, 71a, and 72a. On completion of step S54, in step S32, the navigation apparatus 10 receives the location information on the preliminary passage locations 70a, 71a, and 72a from the server apparatus 11, and then, in step S33, the navigation apparatus 10 calculates, respectively for the preliminary passage locations 70a, 71a, and 72a, travel routes thereto from the current location on the basis of the map information stored in the map information memory 25. Here, the preliminary travel routes calculated by the server apparatus 11 do not necessarily have to coincide with the travel routes calculated by the navigation apparatus 10.

After step S33, in step S34, the navigation apparatus 10 displays the preliminary travel routes along with their ranks or priority (not illustrated) in order to permit the user of the navigation apparatus 10 to select the optimum one of the preliminary passage locations while taking into consideration the calculated travel routes and the ranks of priority given by the server apparatus 11. For example, if the preliminary passage location 71a is selected, then, in step S35, the current location and the planned travel route leading to the passage location 71a are displayed on the display 23 in a form superimposed on the map information. Then, as the current location moves, the screen is scrolled accordingly. One of the preliminary passage locations may be selected not by the user but automatically by the navigation apparatus 10 by selecting the one with the highest priority among the preliminary passage locations that agree with the map information stored in the navigation apparatus 10.

After step S35, in step S36, the navigation apparatus 10 checks whether or not the current location has come within a predetermined distance (for example, 2 km) of the passage location 71a. If, in step S36, the current location is found not to have come within the predetermined distance, the travel route guidance is continued until that happens. By contrast, if, in step S36, the current location is found to have come within the predetermined distance, it is now recognized that the map information stored in the map information memory 25 is scarce and that the planned travel route needs to be updated. Accordingly, then, in step S37 in FIG. 4, the navigation apparatus 10 requests new map information from the server apparatus 11. The map information requested here may be map information around the passage location 71a (for example, the area within a 5 km radius of the passage location 71a) that is not stored in the map information memory 25. In FIG. 3, the symbols A and B are connectors indicating that the operation flow connects to the symbols A and B, respectively, in FIG. 4.

Figure 4:
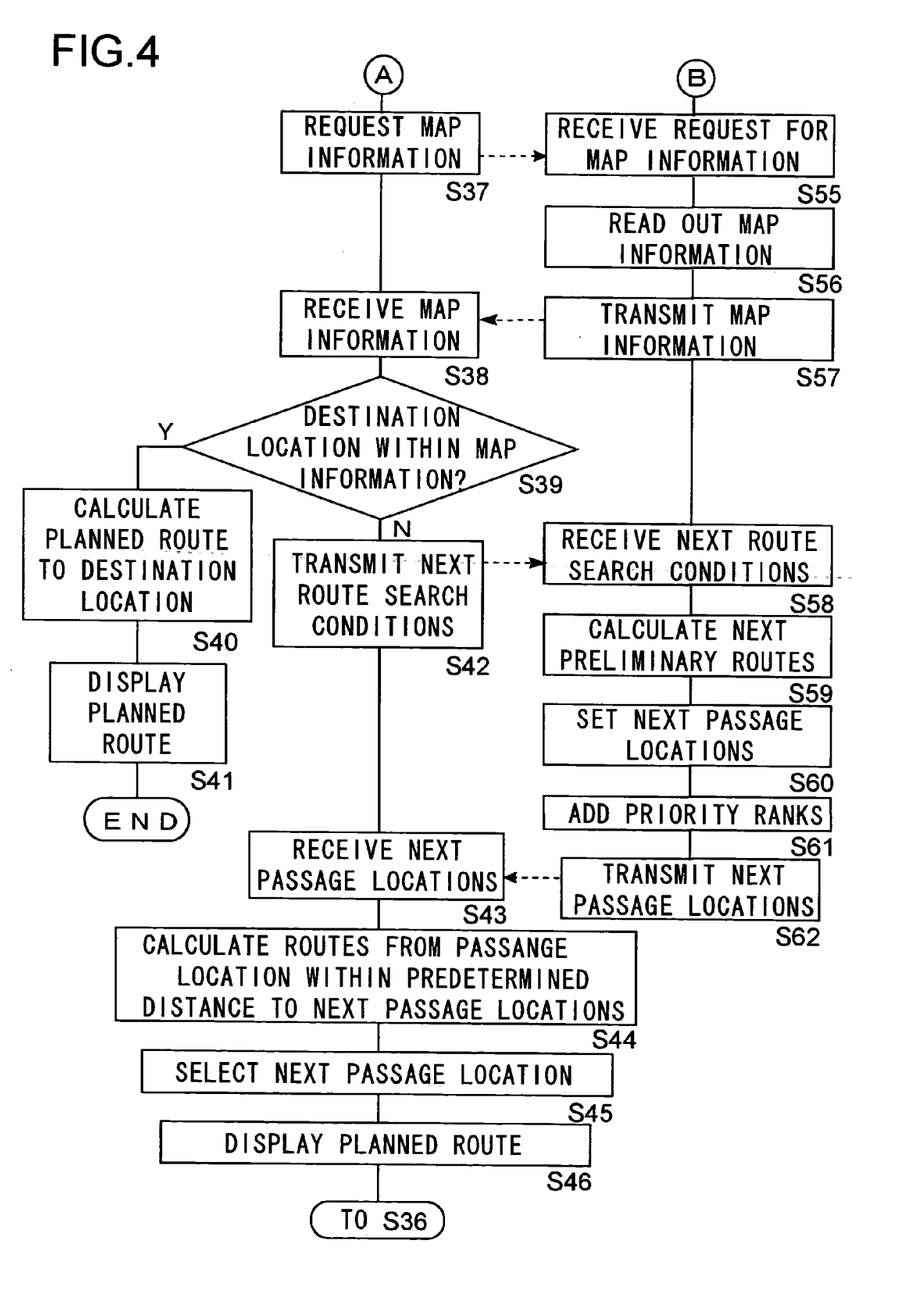
FIG. 4 is a flow chart that follows FIG. 3.

On completion of step S37, in step S55, the server apparatus 11 receives the request for map information from the navigation apparatus 10, then, in step S56, the server apparatus 11 reads out appropriate map information from the database 12, and then, in step S57, the server apparatus 11 transmits that map information to the navigation apparatus 10.

Figure 7:
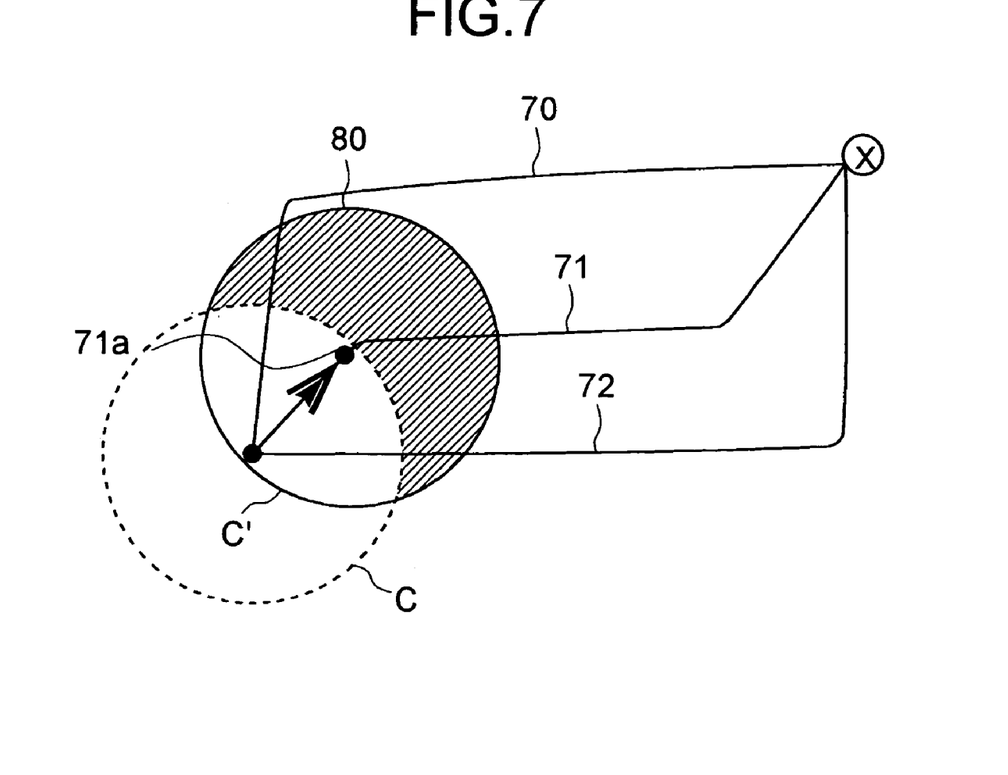
FIG. 7 is a diagram showing how the area of the map information stored in the map information memory moves when the map information is updated.

On completion of step S57, in step S38, the navigation apparatus 10 receives the map information from the server apparatus 11, deletes from the map information stored in the map information memory 25 the part relating to an unnecessary area, and instead additionally stores therein the newly received map information. FIG. 7 shows the area of the map information stored in the map information memory 25 after the updating of the map information. A broken-line circle C indicates the area of the map information stored in the map information memory 25 before the updating, and a solid-line circle C' indicates the area of the map information stored in the map information memory 25 after the updating. In FIG. 7, a hatched area 80 indicates the map information additionally received by the navigation apparatus 10.

After step S38, in step S39, whether or not the destination location X is situated within the updated map information is checked. If, in step S39, the destination location is found to be situated there, then, in step S40, on the basis of the updated map information, a planned travel route from the passage location 71a to the destination location is calculated. After step S40, in step S41, while the screen is scrolled as the current location moves, the planned travel route to the destination location is displayed.

By contrast, if, in step S39, the destination location is found not to be situated within the map information, then, in step S42, the next route search conditions including location information on the passage location 71a and the area of the map information stored in the map information memory 25 are transmitted to the server apparatus 11.

Figure 8:
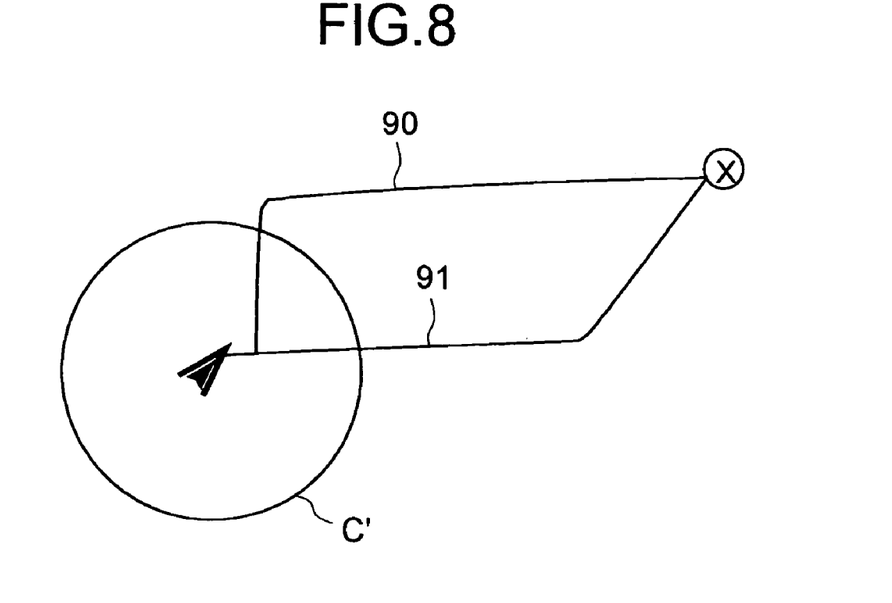
FIG. 8 is a diagram showing an example of preliminary travel routes from a passage location to the destination location.

On completion of step S42, in step S58, the server apparatus 11 receives the next route search conditions from the navigation apparatus 10, and then, in step S59, the server apparatus 11 calculates more than one preliminary travel routes from the passage location 71a to the destination location by accessing the database 12. FIG. 8 shows an example of such preliminary travel routes. In FIG. 8, there are shown two preliminary travel routes 90 and 91.

Figure 9:
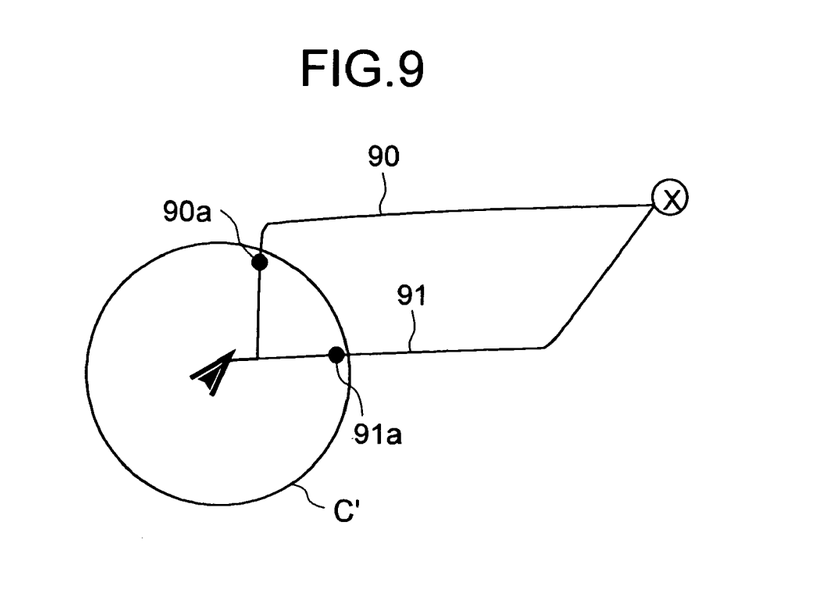
FIG. 9 is a diagram showing next preliminary passage locations superimposed on the preliminary travel routes next to those shown in FIG. 8.

After step S59, in step S60, the server apparatus 11 sets, respectively for the calculated next preliminary travel routes, next preliminary passage locations on those travel routes within the area of the map information stored in the map information memory 25. FIG. 9 is a diagram showing the next preliminary passage locations added on to the next preliminary travel routes. In the figure, circles 90a and 91a represent the next preliminary passage locations on the next preliminary travel routes 90 and 91, respectively.

After step S60, in step S61, as in step S53, the server apparatus 11 gives the preliminary travel routes different ranks of priority according to the traffic, distance, and other factors on those routes, and then, according to those ranks of priority, the server apparatus 11 also gives the preliminary passage locations different ranks of priority.

After step S61, in step S62, the server apparatus 11 transmits to the navigation apparatus 10 location information on the next preliminary passage locations 90a and 91a. On completion of step S62, in step S43, the navigation apparatus 10 receives the location information on the next preliminary passage locations 90a and 91a from the server apparatus 11, and then, in step S44, the navigation apparatus 10 calculates, respectively for the next preliminary passage locations 90a and 91a, travel routes thereto from the passage location 71a on the basis of the map information stored in the map information memory 25. Here, the preliminary travel routes calculated by the server apparatus 11 do not necessarily have to coincide with the travel routes calculated by the navigation apparatus 10.

After step S44, in step S45, the navigation apparatus 10 displays the preliminary travel routes along with their ranks or priority (not illustrated) in order to permit the user of the navigation apparatus 10 to select the optimum one of the next preliminary passage locations while taking into consideration the calculated travel routes and the ranks of priority given by the server apparatus 11. For example, if the preliminary passage location 91a is selected, then, in step S46, while the screen is scrolled as the current location moves, the planned travel route leading to the passage location 91a is displayed.

Thereafter, the operation flow returns from step S46 to step S36, and the planned travel route is repeatedly updated until the navigation apparatus 10 receives map information covering the destination location. In this way, guidance along a travel route up to the destination location is accomplished.

As described above, a passage location as a preliminary destination location is determined within the area of the map information stored in the navigation apparatus 10, then a planned travel route to the passage location is displayed, and then, as the current location moves, the map information, passage location, and planned travel route are repeatedly updated to accomplish guidance along a travel route to the destination location. In this way, it is possible to achieve guidance along a travel route without increasing the storage capacity of the map information memory 25 of the navigation apparatus 10. Moreover, since only necessary information is exchanged as map information, passage locations, and the like, it is possible to minimize the communication fee.

In the embodiment described above, in a case where a deviation from the planned travel route is recognized in the course of guidance along a travel route, the navigation apparatus 10 can, while taking into consideration, in addition to the ranks of priority given to the preliminary passage locations by the server apparatus 11, the direction of the current location, the distances to the passage locations, and other factors, select preliminary passage locations anew and calculate planned travel routes again.

In the embodiment described above, when the destination location is set within the area of the map information stored in the navigation apparatus 10, the navigation apparatus 10 can, on the basis of the map information currently stored therein, calculate a planned travel route from the current location to the destination location.

<Second Embodiment>

Next, a description will be given of how the navigation apparatus 10 and the server apparatus 11 operate to achieve guidance along a travel route in a second embodiment of the invention. First, the user enters the destination location by operating the input section 24 of the navigation apparatus 10, and then presses a route search execution key (not illustrated). Now, the navigation apparatus 10 transmits location information on the current location and the destination location to the server apparatus 11. On receiving this location information, the server apparatus 11 calculates planned travel routes by accessing the database 12.

Then, the server apparatus 11 transmits the calculated planned travel routes to the navigation apparatus 10. Here, if the navigation apparatus 10 does not have map information with such a scale factor as permits the planned travel routes to be displayed in a single screen, the server apparatus 11 also transmits appropriate map information thereto.

On receiving the planned travel routes etc., the navigation apparatus 10 stores the received data in the RAM 26, and displays it on the display 23 in a form superimposed on the current location. This permits the user to grasp a rough travel route from the current location to the destination location.

Figure 10:
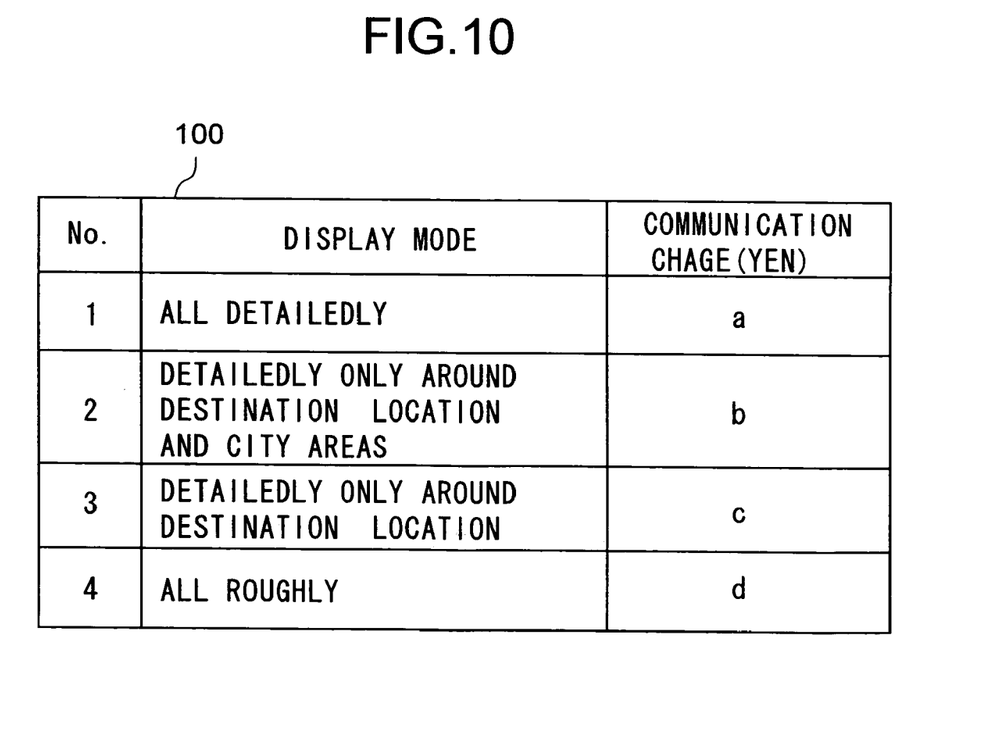
FIG. 10 is a diagram showing a list of display modes according to the invention.

Subsequently, the navigation apparatus 10 displays on the display 23 a list 100 of display modes as shown in FIG. 10 to permit the selection of a combination of scale factors of map information. Shown together in FIG. 10 are the expected communication fees charged when map information up to the destination location is received in those modes respectively. The user can select the desired display mode while referring to the expected communication fees.

When a display mode is selected, the navigation apparatus 10 requests from the server apparatus 11, as necessary, map information with the scale factors conforming to the selected display mode. In response, the server apparatus 11 reads out, as necessary, map information from the database 12, and transmits it to the navigation apparatus 10. The navigation apparatus 10 displays the received map information with a planned travel route and the current location superimposed thereon to achieve guidance along a travel route.

For example, in FIG. 10, if display mode No. 1 is selected, all the received information is with a high scale factor, with the communication fee expected to be "a" yen, i.e., the highest. If display mode No. 2 is selected, map information with a high scale factor is received when traveling through city areas and near the destination location, and otherwise map information with a low scale factor is received, with the communication fee expected to be "b" yen, i.e., lower than "a" yen. If display mode No. 3 is selected, map information with a high scale factor is received only when traveling near the destination location, and otherwise map information with a low scale factor is received, with the communication fee expected to be "c" yen, i.e., lower than "b" yen. If display mode No. 4 is selected, all the received information is with a low scale factor, with the communication fee expected to be "d" yen, i.e., lower than "c" yen.

The expression "around the destination location" used above is not intended to place any specific requirement on how far away from the destination location. For example, it denotes an area on a map within a predetermined radius (for example, 2 km) of the destination location. The expression "city areas" used above also is not intended to require any specific qualification of such areas. For example, relevant areas on a map may be set and registered when the navigation apparatus is manufactured, or areas on a map where the number of buildings, traffic lights, or crossroads per unit area or another parameter is greater than a predetermined number may be used.

In FIG. 10, expected communication fees are displayed. It is, however, also possible to additionally display expected received data amounts and expected reception durations. An expected received data amount is the total amount of map information that is expected to be received, and is used as the basis on which to calculate the communication fee. The higher the scale factor of the received map information, the larger the amount of received data. On the other hand, an expected reception duration is the length of time required to receive all the map information that is expected to be received, and is proportional to the amount of received data; that is, the higher the scale factor of the received map information, and thus the larger the amount of received data, the longer the reception duration.

In this way, the list 100 of display modes permits the user to previously know the communication fees that are expected to be charged for guidance along a travel route, and thus the user can unsparingly use the navigation apparatus 10. Moreover, when a desired display mode is selected, the scale factor of the displayed map is automatically switched. This eliminates the need for the user to manually change the scale factor of maps in the course of guidance along a travel route as required conventionally, and thus helps realize a safe navigation apparatus that does not place a burden on the user who is driving.

The embodiment described above deals with a case where the navigation apparatus 10 incorporates the program for achieving different display modes. Now, a description will be given of another embodiment in which the server apparatus 11 incorporates a program for achieving different display modes.

First, as in the embodiment described above, the server apparatus 11 calculates a planned travel route, and it is displayed on the display 23 of the navigation apparatus 10 with the current location and the destination location superimposed thereon. Subsequently, the navigation apparatus 10 requests from the server apparatus 11 a list 100 (FIG. 10) of display modes according to which to set a combination of scale factors of maps. In response, the server apparatus 11 transmits a previously set and registered list 100 of display modes to the navigation apparatus 10. On receiving the list 100 of display modes, the navigation apparatus 10 stores the received data in the RAM 26 and displays it on the display 23. Here, it is assumed that the list 100 of display modes so received is stored until the navigation apparatus 10 is turned off and can thus be read out repeatedly from the RAM 26 until then.

When the user selects a display mode, the navigation apparatus 10 transmits the selected display mode to the server apparatus 11. Thereafter, whenever the next map information is needed, the navigation apparatus 10 requests it from the server apparatus 11. In response, the server apparatus 11, taking the current location of the navigation apparatus 10 into consideration, determines a scale factor conforming to the display mode, reads out map information with that scale factor from the database 12, and transmits it to the navigation apparatus 10. The navigation apparatus 10 displays the received map information with a planned travel route and the current location superimposed thereon to achieve guidance along a travel route.

In this way, the server apparatus 11 incorporates a list 100 of display modes, and the navigation apparatus 10, as necessary, receives the list 100 of display modes from the server apparatus 11 and uses it. As a result, when the contents of the display modes are modified, it is necessary only to modify the program incorporated in the server apparatus 11, and no modifications are needed in individual navigation apparatuses 10. This makes modifications of the contents easy, and thus helps save the trouble required for that.

According to the present invention, the scale factors that can be selected for different display modes may be divided into a larger number of steps so that the display modes shown in the list 100 are classified more finely. Moreover, according to the present invention, the display mode may be changed at any time. This permits the display mode to be switched to a desired one even in the course of guidance along a travel route.

Figure 11:
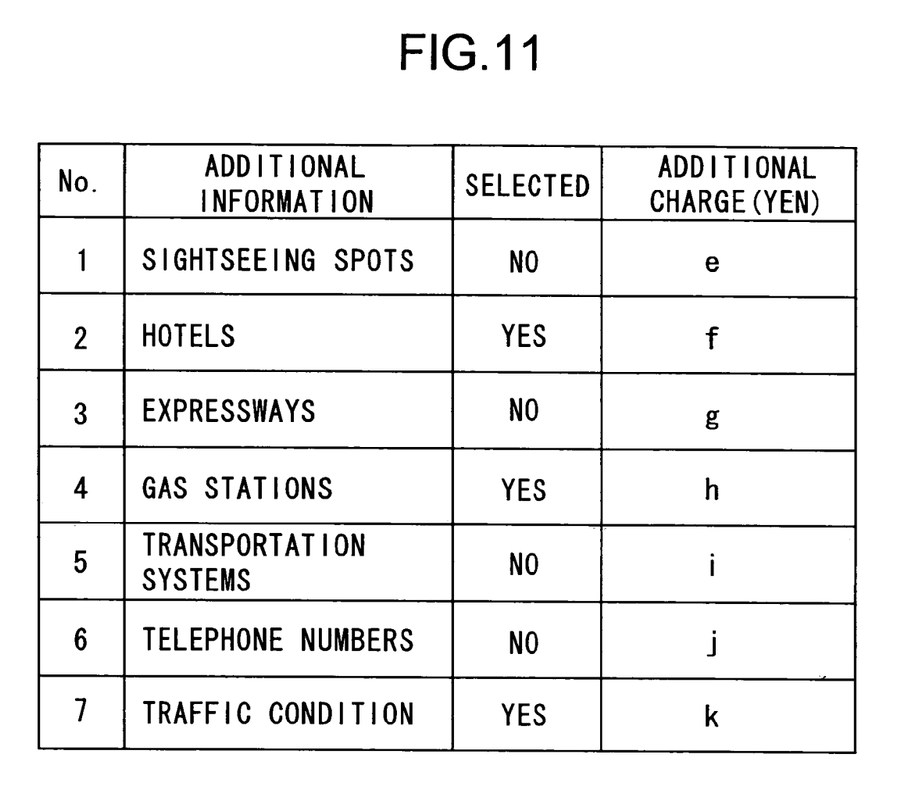
FIG. 11 is a diagram showing another list of display modes according to the invention.

The larger the amount of received map information, the longer the required communication duration, and thus the higher the fee. Accordingly, in the example described above, what information to receive is selected according to the scale factor, assuming that a more detailed map with a higher scale factor involves a larger amount of data. It is, however, also possible to apply the present invention in cases where there is any difference in the amount of received map information. For example, as shown in FIG. 11, additional information such as information relating to sightseeing spots, hotels, expressways, gas stations, transportations systems, telephone numbers, traffic condition, and the like is part of the map information that is received to achieve guidance along a travel route, and, with respect to such additional information, what map information to receive may be selected. The method for such selection may be, as shown in FIG. 11, by choosing whether or not to receive a particular kind of additional information.

The first and second embodiments described above may be practiced in a combined manner without any disadvantage.

INDUSTRIAL APPLICABILITY

A navigation apparatus according to the present invention can be used not only as a portable or car-mounted navigation apparatus but also in a form incorporated in a cellular phone, PDA (personal digital assistant), personal computer, or the like.

The invention claimed is:

1. A navigation system comprising at least one navigation apparatus and at least one server apparatus, wherein
the navigation apparatus comprises
a communication controller for controlling communication with the server apparatus,
a current location detector for detecting a current location,
a map information memory for storing map information,
a display for displaying map information and the current location, and
a controller for calculating a planned travel route and for controlling the communication controller, the current location detector, the map information memory, and the display,
the server apparatus reads out map information from a database and transmits the map information to the navigation apparatus,
the communication controller of the navigation apparatus transmits to the server apparatus the current location, a destination location, and an area of the map information stored in the memory,
the server apparatus receives the current location, the destination location, and the area of the map information stored in the map information memory, calculates one or more preliminary travel routes from the current location to the destination location, sets, respectively for the preliminary travel routes, preliminary passage locations within the area of the map information stored in the navigation apparatus, and transmits the preliminary passage locations to the navigation apparatus,
the communication controller of the navigation apparatus receives the preliminary passage locations, and the controller calculates, respectively for the preliminary passage locations, planned travel routes thereto from the current location, and
one of the preliminary passage locations is selected.

2. A navigation apparatus comprising:
a communication controller for controlling communication with a server apparatus,
a current location detector for detecting a current location,
a map information memory for storing map information,
a display for displaying map information and the current location, and
a controller for calculating a planned travel route and for controlling the communication controller, the current location detector, the map information memory, and the display, wherein
when the current location comes within a predetermined distance of a previously set passage location,
the communication controller
receives, from the server apparatus, map information of a predetermined area that is not stored in the map information memory, and stores the received map information in the map information memory,
transmits, to the server apparatus, the passage location of which the current location has come within the predetermined distance and an area of the map information stored in the map information memory, and
receives, from the server apparatus and based on one or more preliminary travel routes from the passage location of which the current location has come within the predetermined distance to a destination location as calculated by the server apparatus, next preliminary passage locations set, respectively for the preliminary travel routes, within the area of the map information stored in the map information memory,
the controller calculates, respectively for the next preliminary passage locations, planned travel routes thereto from the passage location of which the current location has come within the predetermined distance, and
one of the next preliminary passage locations is selected.

3. A navigation apparatus comprising:
a communication controller for controlling communication with a server apparatus,
a current location detector for detecting a current location,
a map information memory for storing map information,
a display for displaying map information and the current location, and
a controller for calculating a planned travel route and for controlling the communication controller, the current location detector, the map information memory, and the display, wherein
the communication controller
transmits, to the server apparatus, the current location, a destination location, and an area of the map information stored in the map information memory, and
receives, from the server apparatus and based on one or more preliminary travel routes from the current location to the destination location as calculated by the server apparatus, preliminary passage locations set, respectively for the preliminary travel routes, within the area of the map information stored in the map information memory,
the controller calculates, respectively for the preliminary passage locations, planned travel routes thereto from the current location,
one of the preliminary passage locations is selected,
when the current location comes within a predetermined distance of the selected passage location,
the communication controller
receives, from the server apparatus, map information of a predetermined area that is not stored in the map information memory, and stores the received map information in the map information memory, transmits, to the server apparatus, the passage location of which the current location has come within the predetermined distance and an area of the map information stored in the map information memory, and receives, from the server apparatus and based on one or more next preliminary travel routes from the passage location of which the current location has come within the predetermined distance to the destination location as calculated by the server apparatus, next preliminary passage locations set, respectively for the next preliminary travel routes, within the area of the map information stored in the map information memory, the controller calculates, respectively for the next preliminary passage locations, planned travel routes thereto from the passage location of which the current location has come within the predetermined distance, and one of the next preliminary passage locations is selected.

4. A navigation apparatus as claimed in claim 2 or 3, wherein, when a deviation from a planned travel route is recognized while guidance along a travel route is being given, a planned travel route is calculated based on the preliminary passage locations.

5. A navigation apparatus as claimed in claim 3, wherein the preliminary passage locations are given different ranks of priority by the server apparatus.

6. A navigation apparatus as claimed in claim 3, wherein the navigation apparatus has a capability of previously selecting among different combinations of scale factors of map information received from the server apparatus.

7. A navigation apparatus as claimed in claim 6, wherein the navigation apparatus displays, along with a list of the combinations of scale factors, expected communication fees respectively for the combinations.

8. A navigation apparatus as claimed in claim 6, wherein the navigation apparatus displays, along with a list of the combinations of scale factors, expected received data amounts respectively for the combinations.

9. A navigation apparatus as claimed in claim 6, wherein the navigation apparatus displays, along with a list of the combinations of scale factors, expected reception durations respectively for the combinations.

10. A server apparatus that reads out map information from a database and transmits the map information to a navigation apparatus, wherein, when the server apparatus receives, from the navigation apparatus, a current location, a destination location, and an area of map information stored in the navigation apparatus, the server apparatus calculates one or more preliminary travel routes from the current location to the destination location, sets, respectively for the preliminary travel routes, preliminary passage locations within the area of the map information stored in the navigation apparatus, and transmits the preliminary passage locations to the navigation apparatus, and when the server apparatus receives, from the navigation apparatus, one of the preliminary passage locations and an area of map information stored in the navigation apparatus, the server apparatus calculates one or more preliminary travel routes from the received passage location to the destination location, sets, respectively for the preliminary travel routes, next preliminary passage locations within the area of the map information stored in the navigation apparatus, and transmits the next preliminary passage locations to the navigation apparatus.

11. A server apparatus as claimed in claim 10, wherein the server apparatus gives the preliminary passage locations different ranks of priority.

12. A navigation apparatus that guides along a travel route from a start location to a destination location by using map information received from a server apparatus, wherein the navigation apparatus has a capability of displaying a list of different combinations of data amounts or scale factors of the received map information and previously selecting one of the combinations from the list.

13. A navigation apparatus as claimed in claim 12, wherein the navigation apparatus displays, along with a list of the combinations of data amounts or scale factors, expected communication fees respectively for the combinations.

14. A navigation apparatus as claimed in claim 12, wherein the navigation apparatus displays, along with a list of the combinations of data amounts or scale factors, expected received data amounts respectively for the combinations.

15. A navigation apparatus as claimed in claim 12, wherein the navigation apparatus displays, along with a list of the combinations of data amounts or scale factors, expected reception durations respectively for the combinations.

* * * * *